(12) United States Patent
Choi et al.

(10) Patent No.: US 11,960,643 B2
(45) Date of Patent: Apr. 16, 2024

(54) HEAD MOUNTED DISPLAY APPARATUS, METHOD FOR OPERATING THE SAME, AND COMPUTER-READABLE RECORDING MEDIUM

(71) Applicant: Samsung Electronics Co., Ltd., Gyeonggi-do (KR)

(72) Inventors: Jaesung Choi, Gyeonggi-do (KR); Wonjoon Do, Gyeonggi-do (KR); Woojhon Choi, Gyeonggi-do (KR); Kihuk Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 347 days.

(21) Appl. No.: 17/427,736

(22) PCT Filed: Jul. 13, 2021

(86) PCT No.: PCT/KR2021/008972
§ 371 (c)(1),
(2) Date: Aug. 2, 2021

(87) PCT Pub. No.: WO2022/196869
PCT Pub. Date: Sep. 22, 2022

(65) Prior Publication Data
US 2023/0359270 A1    Nov. 9, 2023

(30) Foreign Application Priority Data

Mar. 15, 2021 (KR) .......................... 10-2021-0033198

(51) Int. Cl.
*G06F 3/01* (2006.01)
*G06T 7/70* (2017.01)

(52) U.S. Cl.
CPC ................ *G06F 3/013* (2013.01); *G06T 7/70* (2017.01); *G06T 2207/30201* (2013.01)

(58) Field of Classification Search
CPC .......... G06F 3/011; G06F 3/012; G06F 3/013; H04N 13/332
See application file for complete search history.

(56) References Cited

U.S. PATENT DOCUMENTS

| 2009/0278913 A1 | 11/2009 | Rosenfeld et al. |
| 2014/0375540 A1 | 12/2014 | Ackerman et al. |

(Continued)

FOREIGN PATENT DOCUMENTS

| KR | 10-2002-0067948 A | 8/2002 |
| KR | 10-2013-0000231 A | 1/2013 |

(Continued)

OTHER PUBLICATIONS

International Search Report dated Dec. 10, 2021.

*Primary Examiner* — Kevin M Nguyen
(74) *Attorney, Agent, or Firm* — Cha & Reiter, LLC

(57) ABSTRACT

Provided are a head mounted display apparatus, an operating method thereof, and a storage medium. The head mounted display apparatus includes at least one display, at least one camera disposed on a back surface of the at least one display, and a controller, in which the controller is configured to obtain an image regarding both eyes of a user through the at least one camera, detect the both eyes of the user from the obtained image, measure an inter-pupillary distance (IPD) of the user based on the detected both eyes of the user, convert a picture based on the measured IPD, and display the converted picture on the at least one display.

15 Claims, 11 Drawing Sheets

(56) References Cited

U.S. PATENT DOCUMENTS

| | | |
|---|---|---|
| 2017/0200285 A1 | 7/2017 | Hwang et al. |
| 2017/0270637 A1 | 9/2017 | Perreault et al. |
| 2017/0344107 A1* | 11/2017 | Aghara .................. G06F 3/011 |
| 2018/0047369 A1 | 2/2018 | Zhao et al. |
| 2018/0137648 A1 | 5/2018 | Kang et al. |
| 2018/0348860 A1 | 12/2018 | Lin et al. |
| 2020/0113755 A1 | 4/2020 | Seko et al. |
| 2020/0273426 A1 | 8/2020 | Gollier et al. |
| 2020/0355928 A1* | 11/2020 | Dai ........................ G06F 3/012 |

FOREIGN PATENT DOCUMENTS

| | | |
|---|---|---|
| KR | 10-2013-0107981 A | 10/2013 |
| KR | 10-2016-0041265 A | 4/2016 |
| KR | 10-2017-0083225 A | 7/2017 |
| KR | 10-2018-0003028 A | 1/2018 |
| KR | 10-2018-0054401 A | 5/2018 |
| KR | 10-1862381 B1 | 5/2018 |
| KR | 10-2019-0140680 A | 12/2019 |
| KR | 10-2020-0096002 A | 8/2020 |

* cited by examiner

HEAD MOUNTED DISPLAY APPARATUS, METHOD FOR OPERATING THE SAME, AND COMPUTER-READABLE RECORDING MEDIUM

CROSS REFERENCE TO RELATED APPLICATIONS

This application is a National Phase Entry of PCT International Application No. PCT/KR2021/008972, which was filed on Jul. 13, 2021, and claims priority to Korean Patent Application No. 10-2021-0033198, which was filed on Mar. 15, 2021, the contents of which are incorporated herein by reference.

TECHNICAL FIELD

Various embodiments of the present disclosure relate to a head mounted display apparatus, an operating method of the same, and a storage medium.

BACKGROUND ART

Some of electronic devices are provided in the form of being wearable on a human body. These types of electronic devices may be referred to as wearable devices. The wearable device may include a head mounted display device such as a head mounted display (HMD) among types of electronic devices wearable on human bodies.

The head mounted display device may be worn on a part of a body of a user (e.g., a user's head) to provide a virtual reality (VR) environment to the user. Providing the VR environment may include, for example, displaying a screen capable of implementing the VR, providing various user interfaces capable of implementing the VR, etc.

DISCLOSURE

Technical Problem

An inter-pupillary distance (IPD) is the distance between the two pupils of a user. The IPD of a user may differ from other users according to physical characteristics of the user. Additionally, the IPD of the user can change over a period of time. Additionally, the IPD can be different when the same users watches the same content, based on the degree of immersion. Moreover, due to a discrepancy among the IPD of the user, a distance between optical lenses of the head mounted display device, and a distance between displays on which an image is displayed, the user may experience VR motion sickness such as motion sickness, vomiting, dizziness, etc.

Various embodiments of the present disclosure may provide an electronic device and an operating method thereof, in which an under-display camera is disposed under a display panel of a head mounted display device, a user's inter-pupillary distance (IPD) is measured using the under-display camera to convert an image based on the IPD of the user, and the converted image is displayed on a display.

Technical Solution

According to certain embodiments, an operating method of a head mounted display apparatus comprises at least one display and at least one camera disposed behind a back surface of the at least one display. The operating method comprises: obtaining an image of both eyes of a user through the at least one camera; detecting the both eyes of the user from the obtained image; measuring an inter-pupillary distance (IPD) of the user based on the detected both eyes of the user in the image; converting a picture based on the measured IPD; and providing the converted picture to the at least one display, wherein the at least one display displays the converted picture.

According to an embodiment, a head mounted display apparatus comprises at least one display; at least one camera disposed behind a back surface of the at least one display; and a controller, a memory storing a plurality of instructions executable by the controller, wherein execution of the instructions cause the controller to performing a plurality of operations comprising: obtaining an image of both eyes of a user through the at least one camera; detecting the both eyes of the user from the obtained image; measuring an inter-pupillary distance (IPD) of the user based on the detected both eyes of the user in the image; converting a picture based on the measured IPD; and providing the converted picture to the at least one display, wherein the at least one display displays the converted picture.

According to certain embodiments, a computer-readable recording medium has stored therein a program for executing operations by a controller in a head mounted display apparatus comprising at least one display and at least one camera disposed behind a back surface of the at least one display, the operations comprising: obtaining an image regarding both eyes of a user through the at least one camera; detecting the both eyes of the user from the obtained image; measuring an inter-pupillary distance (IPD) of the user based on the detected both eyes of the user in the obtained image; converting a picture based on the measured IPD; and displaying the converted picture on the at least one display.

Advantageous Effects

According to various embodiments of the present disclosure, both eyes of a user may be photographed through an under-display camera included in a display panel of a head mounted display apparatus, an inter-pupillary distance (IPD) of the user may be automatically measured based on an image captured through the under-display camera, a picture may be converted appropriately for the user based on the measured IPD, and the converted picture may be displayed, thereby improving the degree of immersion in a virtual reality (VR) experience of the user.

According to various embodiments of the present disclosure, a distance between optical lenses and/or a distance between displays on which a picture is displayed may be adjusted appropriately for the user based on the IPD measured through the under-display camera included in the display panel of the head mounted display apparatus, thereby enhancing the degree of immersion in the VR experience of the user.

MODE FOR INVENTION

Figure 1A:
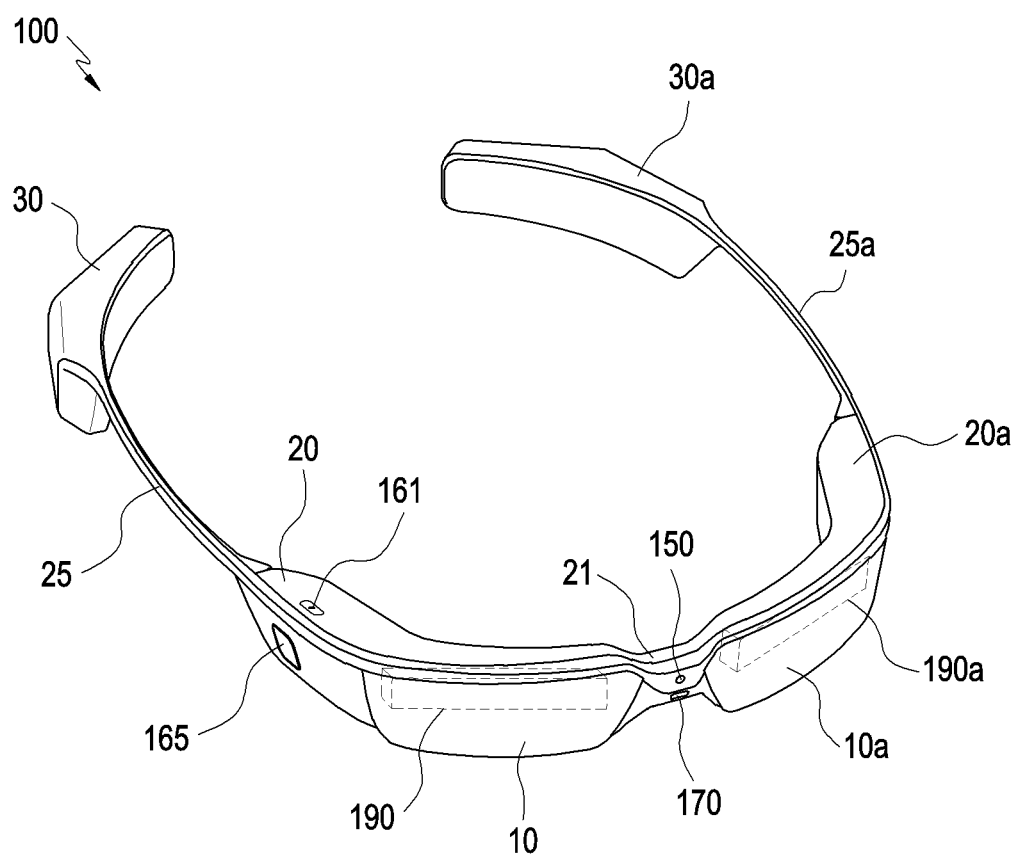
FIGS. 1A and 1B are schematic perspective view showing a head mounted display apparatus according to an embodiment of the present disclosure.

Hereinafter, with reference to details in the attached drawings, exemplary embodiments according to the present disclosure will be described in detail. In addition, with reference to details described in the attached drawings, a method for making and using the present disclosure will be described in detail. A like reference numeral or symbol provided in each drawing indicates a part or component performing substantially the same function.

The terms used herein are for the purpose of describing embodiments only and are not intended to be limiting and/or restricting. It is to be understood that the singular forms include plural references unless the context clearly dictates otherwise. It will be further understood that the terms "comprises" and/or "has," when used herein, specify the presence of a stated feature, number, step, operation, component, element, or combination thereof, but do not preclude the presence or addition of one or more other features, numbers, steps, operations, components, elements, or combinations thereof. Like reference numerals indicated in the drawings refer to members that execute substantially the same function.

Figure 1B:
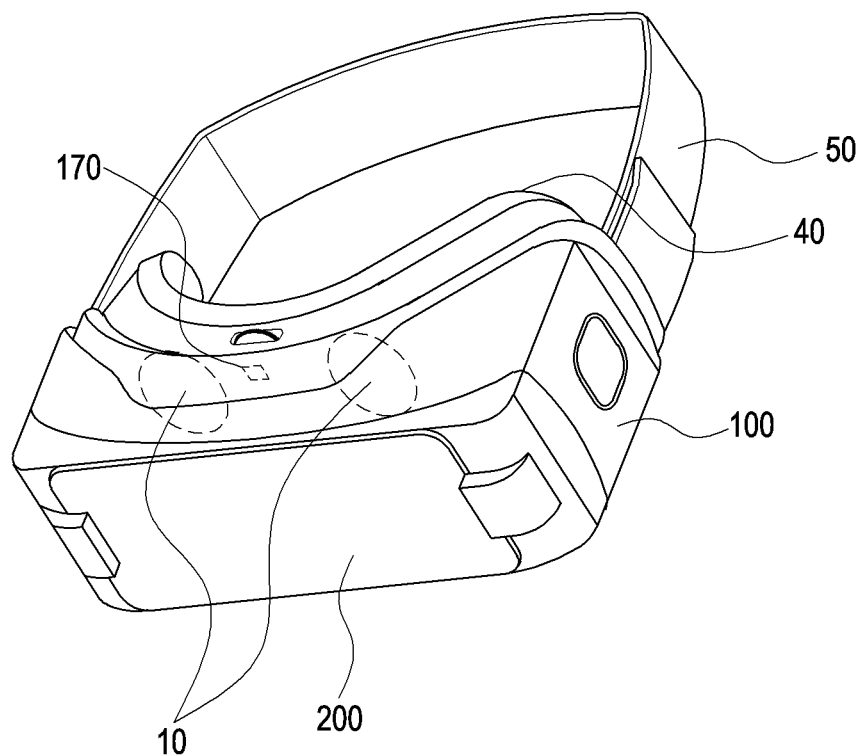

FIGS. 1A and 1B are schematic perspective view showing a head mounted display apparatus 100 according to an embodiment of the present disclosure. It would be easily understood by those of ordinary skill in the art that positions of components shown in the head mounted display apparatus 100 of FIGS. 1A and 1B described below may be changed corresponding to a capability or structure of the head mounted display apparatus 100.

The IPD may vary from user to user, and even for the same user over time. Thus a displaying pictures based on a fixed IPD can cause VR motion sickness. The head mounted display apparatus 100 may prevent VR motion sickness by converting the pictures displayed on the display unit(s) 190, 190a based on the user's IPD. The head mounted display apparatus 100 uses a at least one camera unit 150 to obtain an image of the user's eyes. The head mounted display apparatus 100 can then determine the user's IPD and convert the picture on the display unit(s) 190, 190a to correspond to the user's IPD.

Referring to FIG. 1A, the head mounted display apparatus 100 may mean a display apparatus wearable on a head of a user. A see-through display unit may be positioned in a region adjacent to the head (e.g., an eye) of the user and a speaker (not shown) may be positioned in a region adjacent to an ear of the user, thus providing visual information and auditory information to the user. The head mounted display apparatus 100 may include a glasses-type display apparatus or a helmet-type display apparatus.

The head mounted display apparatus 100 may include a monocular-type display apparatus having one display unit 190 displaying contents or a binocular-type display apparatus having a plurality of display units 190 and 190a capable of displaying a three-dimensional (3D) image. The binocular-type display apparatus may selectively operate one display unit among the plurality of display units 190 and 190a.

The head mounted display apparatus 100 may include an optical lens 10, a first housing 20 that accommodates a part of the optical lens 10, a second housing 30 including a battery, and a housing connector 25 connecting the first housing 20 with the second housing 30. Alternatively, the head mounted display apparatus 100 may include an optical lens 10a, a third housing 20a that accommodates a part of the optical lens 10a, a fourth housing 30a including a battery, and a housing connector 25a connecting the third housing 20a with the fourth housing 30a. The battery may be positioned in the first housing 20 or the third housing 30.

The head mounted display apparatus 100 may be mounted on the user's head by the housing connectors 25 and 25a that are flexible by elasticity.

The head mounted display apparatus 100 may include a bridge 21 that connects the first housing 20 with the third housing 20a.

The display unit 190 or 190a may be positioned at a distance (e.g., 5 cm or less) separated from a front surface of the optical lens 10 or 10a or at a distance (e.g., 5 cm or less) separated from a rear surface of the optical lens 10 or 10a. It would be easily understood by those of ordinary skill in the art that a distance between the display units 190 and 190a, a distance between the optical lenses 10 and 10a, and a separation distance between the display unit 190 or 190a and the optical lens 10 or 10a may be changed according to a capability or structure of the head mounted display apparatus 100. When the user uses the head mounted display apparatus 100, the display unit 190 and 190a display pictures based on an IPD. However, the IPD varies from user to user, and even by the same user over time. The display unit 190 and 190a display content that is converted based on the user's actual IPD.

Figure 2:
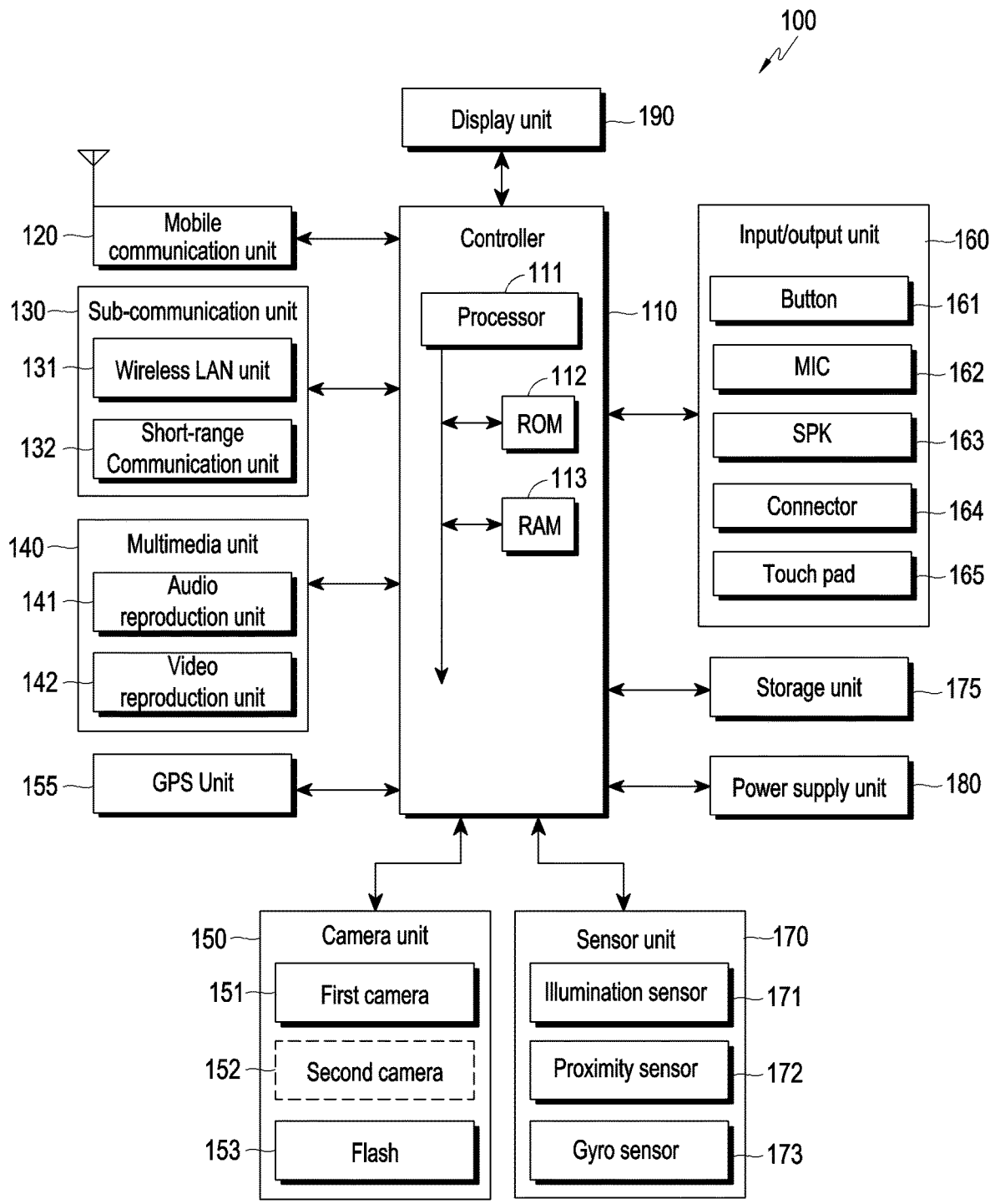
FIG. 2 is a schematic block diagram showing a head mounted display apparatus according to an embodiment of the present disclosure.

The head mounted display apparatus 100 may include a camera unit 150 (see FIG. 2) and a sensor unit 170 (see FIG. 2). The camera unit 150 may be positioned in at least one of the first housing 20 or the third housing 20a. For example, the camera unit 150 may be positioned in one or both of the first housing 20 and the third housing 20a. The camera unit 150 may be positioned in the bridge 21. The camera unit 150 can obtain an image of the user while the user uses the head mounted display apparatus 100. The image can include the user's eyes. The head mounted display apparatus 100 cause use the image to determine the IPD of the user.

According to an embodiment of the present disclosure, at least a part of the camera unit 150 may be included in the display unit 190 or 190a.

The sensor unit 170 may be positioned in at least one of the first housing 20 or the third housing 20a. For example, the sensor unit 170 may be positioned in one or both of the first housing 20 and the third housing 20*a*. The sensor unit 170 may also be positioned in the bridge 21.

The first housing 20 of the head mounted display apparatus 100 may include at least one of a button 161 (see FIG. 2), a microphone 162 (see FIG. 2), a speaker 163 (see FIG. 2), or a touch pad 165 (see FIG. 2). In an embodiment of the present disclosure, a term 'housing' may include the first housing 20, the second housing 30, the third housing 20*a*, or the fourth housing 30*a*.

Referring to FIG. 1B, the head mounted display apparatus 100 may include a display and may be coupled to an external electronic device 200 including a display. As the user wears the head mounted display apparatus 100, the user may view a left-eye image and a right-eye image that are displayed on the display of the head mounted display apparatus 100 or a display of the external electronic device 200.

As illustrated in FIG. 1B, the head mounted display apparatus 100 according to various embodiments may include the sensor unit 170 (see FIG. 2), at least one optical lens 10, a plate (not shown) close to both eyes of the user, a foam cushion 40 closely contacting a face of the user, and a user fixing device 50 provided to be mounted or worn on the head of the user.

The sensor 170 may include at least one of an optical sensor for sensing light or a proximity sensor for determining whether the user wears the head mounted display apparatus 100. The optical sensor and the proximity sensor may be provided separately or may be provided as one sensor (e.g., a proximity sensor). The sensor unit 170 may be disposed in an optimal position for sensing external light passing through the optical lens 10. The sensor unit 170 may identify a type of a light source that emits external light. For example, the sensor unit 170 may determine whether the external light is natural light (sun light) or artificial light (a fluorescent lamp, a light-emitting diode (LED), etc.).

The lens 10 may include a left-eye lens or a right-eye lens. A left-eye image displayed on the display or a display of the external electronic device 200 may reach the user by passing through the left-eye lens, and a right-eye image displayed on the display or the display of the external electronic device 200 may reach the user by passing through the right-eye lens. In various embodiments, the distance between the left-eye lens and the right-eye lens are adjusted or changed based on the user's IPD.

A first surface of the plate may contact at least a part of the display of the external electronic device 200 or may be oriented toward the display of the head mounted display apparatus 100. A second surface opposing the first surface of the plate may be disposed toward the user's face. When the head mounted display apparatus 100 includes the display, the second surface of the plate may oppose the first surface oriented toward the display. When the head mounted display apparatus 100 provides an image corresponding to a VR application by being coupled to the external electronic device 200 including the display, the second surface of the plate may oppose the first surface closely contacting the external electronic device 200. In an embodiment, the VR application may be an application capable of providing a display, which is similar to reality, to the user. In an embodiment, the VR application may display the left-eye image and the right-eye image respectively corresponding to both eyes of the user, based on a stereoscopic scheme.

The user may bring the face (i.e., the both eyes) into close contact with the foam cushion 40, thus observing an image corresponding to the VR application provided from the head mounted display apparatus 100 or the external electronic device 200 coupled to the head mounted display apparatus 100, without interference of external light. For example, the user may observe the left-eye image and the right-eye image with the both eyes through the lens 10.

The user fixing device 50 may be a component for allowing the head mounted display apparatus 100 to be mounted on the user's head. The head mounted display apparatus 100 may be worn on the user's head through the user fixing device 50 and thus may be fixed onto the user's head in spite of user's movement.

Figure 3:
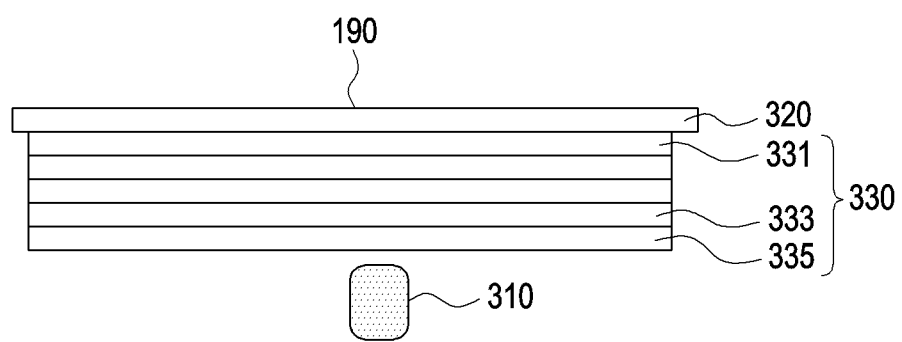
FIG. 3 is a view showing a display unit of a head mounted display apparatus according to an embodiment of the present disclosure.
Figure 4A:
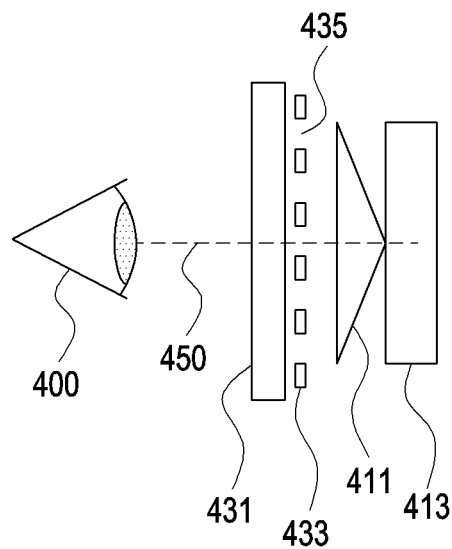
FIGS. 4A and 4B are views showing a display unit of a head mounted display apparatus according to an embodiment of the present disclosure.
Figure 4B:
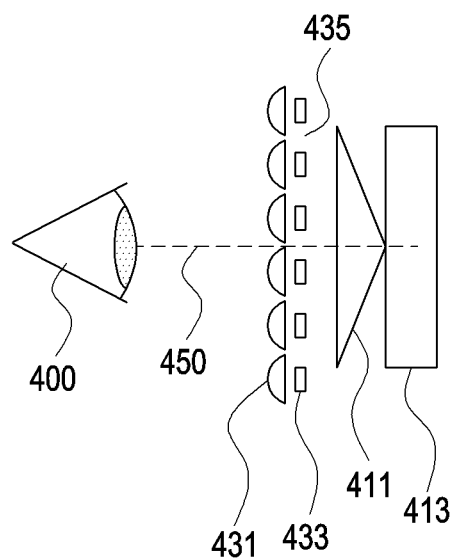

FIG. 2 is a schematic block diagram showing a head mounted display apparatus according to an embodiment of the present disclosure, and FIGS. 3, 4A, and 4B show a display unit of a head mounted display apparatus according to an embodiment of the present disclosure.

Referring to FIG. 2, the head mounted display apparatus 100 may be wiredly or wirelessly connected with an external device (not shown) by using a mobile communication unit 120, a sub-communication unit 130, and a connector 165. The external device may include a cellular phone (not shown), a smartphone (not shown), a tablet PC (not shown), an MP3 player, a video player, a tablet PC, a 3D-television (TV), an LED TV, a liquid crystal display (LCD) TV, or a server (not shown), which includes a screen having a larger area than the display units 190 and 190*a*. The external device may include another head mounted display apparatus (not shown).

The head mounted display apparatus 100 may include a device capable of transmitting/receiving data (e.g., an image, a text, voice, video, etc.) by using a user input (or a user interaction, for example, voice, motion, touch, or touch gesture) input through the head mounted display apparatus 100 and another external device connectable thereto.

The head mounted display apparatus 100 may include the display unit 190 or 190*a*, a controller 110, the mobile communication unit 120, the sub-communication unit 130, a multimedia unit 140, the camera unit 150, a global positioning system (GPS) unit 155, an input/output unit 160, a sensor unit 170, a storage unit 175, and a power supply unit 180.

The sub-communication unit 130 may include at least one of a wireless local area network (WLAN) unit 131 or a short-range communication unit 132, and the multimedia unit 140 may include at least one of an audio reproduction unit 141 or a video reproduction unit 142. The camera unit 150 may include at least one of a first camera 151 or a second camera 152, the input/output unit 160 may include at least one of the button 161, the microphone 162, the speaker 163, the connector 164, or the touch pad 165, and the sensor unit 170 may include an illumination sensor 171, a proximity sensor 172, or a gyro sensor 173.

Referring to FIG. 3, the display unit 190 or 190*a* may include a camera 310. The camera 310 may be at least a part of the camera unit 150. The camera 310 can be used to capture an image of the user, which can include the user's eyes. The picture that the display unit 190/190*a* display can based on the IPD as determined from the image captured by the camera 150. The camera 310 can be positioned behind the display unit 190/190*a*.

According to an embodiment, the display unit 190 or 190*a* may include a plurality of cameras 310. When the head mounted display apparatus 100 is a monocular-type display apparatus including one display unit 190 or 190*a*, the one display unit 190 or 190*a* may include the plurality of cameras 310. When the head mounted display apparatus 100 is a binocular-type display apparatus, each of the plurality of display units 190 and 190*a* may include one camera 310 or the plurality of cameras 310.

According to an embodiment, the camera 310 may be installed in an average eye position and may be installed in any position in which the both eyes are in the field of view.

According to an embodiment of the present disclosure, as the camera 310 is included in the display unit 190 or 190a and thus the camera 310 and the optical lens or 10a are positioned in a straight line, a focal distance may be reduced, whereby the both eyes of the user may be clearly photographed even when a distance between the camera 31 and the both eyes of the user is short.

According to an embodiment, in the display unit 190 or 190a, a transparent glass layer 320 may be disposed to expose the first surface toward the both eyes of the user, and a display panel 330 may be disposed under a second surface (a back surface) of the transparent glass layer 320.

The display panel 330 may include a display element layer 331, a first polymer layer 333 (e.g., polyimide) disposed under the display element layer 331, and a second polymer layer 335 (e.g., polyethylene terephthalate).

The display element 331 may include a circuit layer including a thin film transistor (TFT, not shown), an organic light-emitting diode (OLED, not shown) as a display element, and an insulation layer (IL, not shown) therebetween.

The display panel 330 may include a display driver integrated circuit (not shown). According to an embodiment, at least a part of the transparent glass layer 320 and the display panel 330 may be bent. The display panel 330 may be formed of a flexible polymer film, e.g., polyimide, polyethylene terephthalate, or other polymer materials.

According to an embodiment, the camera 310 may be disposed under a back surface (e.g., the second surface) of the display panel 330. According to an embodiment, the camera 310 may be an under-display camera (UDC) in which at least a part of the camera unit 150 is disposed under the back surface of the display panel 330. According to an embodiment, the camera 310 may be at least a part of the camera unit 150 of FIG. 1A or may be included in the external electronic device 200 of FIG. 1B, and the camera 310 may not be exposed outside.

According to an embodiment, the camera 310 may include at least one of a camera sensor (e.g., an image sensor, not shown) that receives light incident via the transparent glass layer 320, senses the received light to convert the same into a digital signal, and finally obtains an image, that an image processing unit, or a memory (not shown) that stores.

In FIG. 4A, a single lens 431 is between the user's eye 400 and the pixels 435. On the other side of the pixels 435, a lens provides light refracted from the user's eye to the camera 413. In FIG. 4B, instead of one lens 431, there may be multiple lenses 431. The lens 431 may be used to disperse light from pixels 433.

According to an embodiment of the present disclosure, the display panel may include a plurality of pixels 433 of FIGS. 4A and 4B. The plurality of pixels 433 may include passive matrix OLED (PMOLED) pixels driven based on a passive matrix driving scheme or active-matrix OLED (AMOLED) pixels driven based on an active matrix driving scheme.

According to an embodiment, a light source (not shown) of a near-infrared wavelength band may be positioned on the opposite side of the display unit (pixels 433) as the user's eye 400, and the light 450 emitted from the light source may pass through a space 435 and a lens 431 (e.g., the lens 10 of FIGS. 1A and 1B) between the pixels 433 and thus may be reflected from an eye 400. The light 450 reflected from the eye 400 may pass the space 435 between the lens 431 (e.g., the lens 10 of FIGS. 1A and 1B) and the pixels 433, pass through the lens 411, and reach the camera 413, thereby obtaining an eye region image through the camera 413. In an embodiment of the disclosure, the camera 413 may be a camera capable of performing infrared photographing.

According to an embodiment, a plurality of micro lenses 431 may be mounted on a first surface of the pixels 433. The micro lenses 431 may disperse light of the pixels 433 to reduce a phenomenon where regions between the pixels 433 are visible.

According to another embodiment, the display unit 190 or 190a may be an attachable/detachable separate electronic device and in this case, the display unit 190 or 190a may be a smartphone.

The controller 110 may include a processor 111, a read-only memory (ROM) 112 that has stored therein a control program for controlling the head mounted display apparatus 100, and a random-access memory (RAM) 113 that stores a signal or data input from the outside of the head mounted display apparatus 100 or is used as a storage region for various tasks performed in the head mounted display apparatus 100. The term controller 110 shall be understood to refer to the singular and plural contexts.

The controller 110 may control overall operations of the head mounted display apparatus 100 and a signal flow among the internal components 120 through 195 of the head mounted display apparatus 100, and process data.

The controller 110 may control power supply from the power supply unit 180 to the internal components 120 through 195. The controller 190 may execute an operating system (OS) and various applications stored in the storage unit 175, when a condition that is input or set by a user and stored is satisfied.

The processor 111 may include a graphic processing unit (GPU, not shown) for processing graphics. In the processor 111, a core (not shown) and a GPU (not shown) are implemented as a system on chip (SoC). The processor 111 may include a single core, a dual core, a triple core, a quad core, and a core of a multiple thereof. The processor 111, the ROM 112, and the RAM 113 may be interconnected through an internal bus. The term "processor" shall be understood to refer to both the singular and plural contexts.

The controller 110 may control the mobile communication unit 120, the sub-communication unit 130, the multimedia unit 140, the camera unit 150, the GPS unit 155, the input/output unit 160, the sensor unit 170, the storage unit 175, the power supply unit 180, and the display unit 190.

In an embodiment of the present disclosure, the term "controller" may include the processor 111, the ROM 112, and the RAM 113.

The controller 110 according to an embodiment of the present disclosure may control the camera 310 to photograph the both eyes of the user by using the camera 310 included in the display units 190 and 190a.

The controller 110 according to an embodiment of the present disclosure may process an image captured through the camera 310 to detect a binocular region of the user and positions of the both eyes of the user. According to an embodiment, the controller 110 may process the image captured through the camera 310 to identify a pupil of the user, thus identifying a gaze direction.

Figure 5:
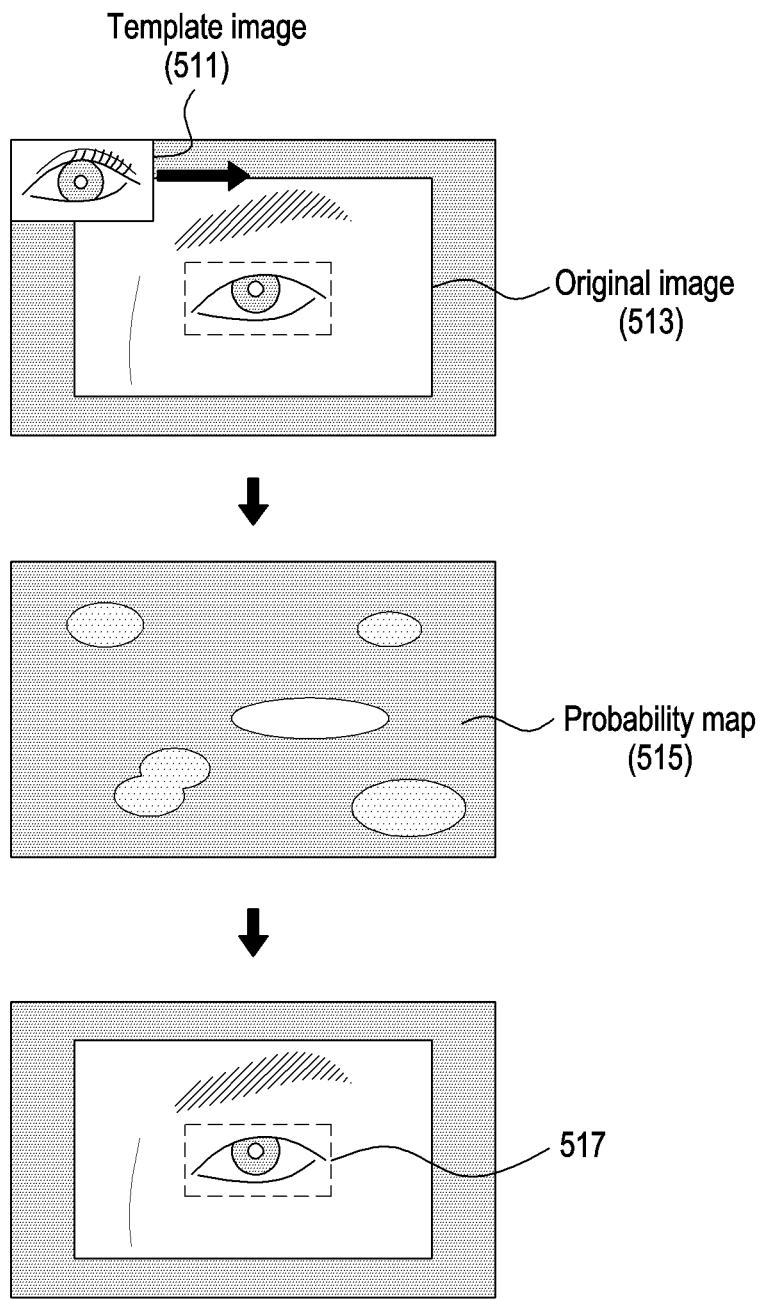
FIG. 5 is a view showing a method for detecting positions of both eyes and a gaze direction in a head mounted display apparatus according to an embodiment of the present disclosure.

FIG. 5 is a view showing a method for detecting positions of eyes and a gaze direction in a head mounted display apparatus according to an embodiment of the present disclosure.

Referring to FIG. 5, the controller 110 according to an embodiment may compare a template image 511 indicating a predefined shape of a pupil with an original image 513 captured through the camera 310 by using a template matching scheme that is one of image processing schemes, determine a position of a part having a high correlation between the two images as a region where an eye of the user is located, by using a probability map 515, and finally detect the position of the eye and a gaze direction 517. According to another embodiment, by using various image processing schemes, deep-learning networks, etc., known to those of ordinary skill in the art, positions of the both eyes and a gaze direction may be detected from the image captured through the camera 310.

Although it is shown in FIG. 5 that the image captured through one camera 310 is processed, when the plurality of cameras 310 may be included in the display unit 190 or 190*a* or the camera 310 is included in each of the display units 190 and 190*a*, the image captured through the plurality of cameras 310 included in the display unit 190 or 190*a* may be subject to image processing as shown in FIG. 5 to detect the positions of the both eyes and the gaze direction of the user.

The controller 110 according to an embodiment of the present disclosure may determine an inter-pupillary distance (IPD) of the user based on the positions of the both eyes and the gaze direction detected from the image captured through the camera 310. According to an embodiment, when the plurality of cameras 310 are included in the display unit 190 or 190*a*, a distance between the plurality of cameras 310 may be used to determine the IPD.

The controller 110 according to an embodiment of the present disclosure may convert an image to be displayed on the display unit 190 or 190*a* of the head mounted display apparatus 100, based on the IPD of the user determined from the image captured through the camera 310. According to an embodiment, conversion of the image to be displayed on the display unit 190 or 190*a* may be performed based on a matrix operation such as affine, projective transformation, etc.

The controller 110 according to an embodiment of the present disclosure may adjust, in terms of hardware, a distance between the optical lenses 10 and 10*a* of the head mounted display apparatus 100 or a distance between the display unit 190 and 190*a* on which the image is displayed, based on the IPD of the user determined from the image captured through the camera 310.

Figure 6:
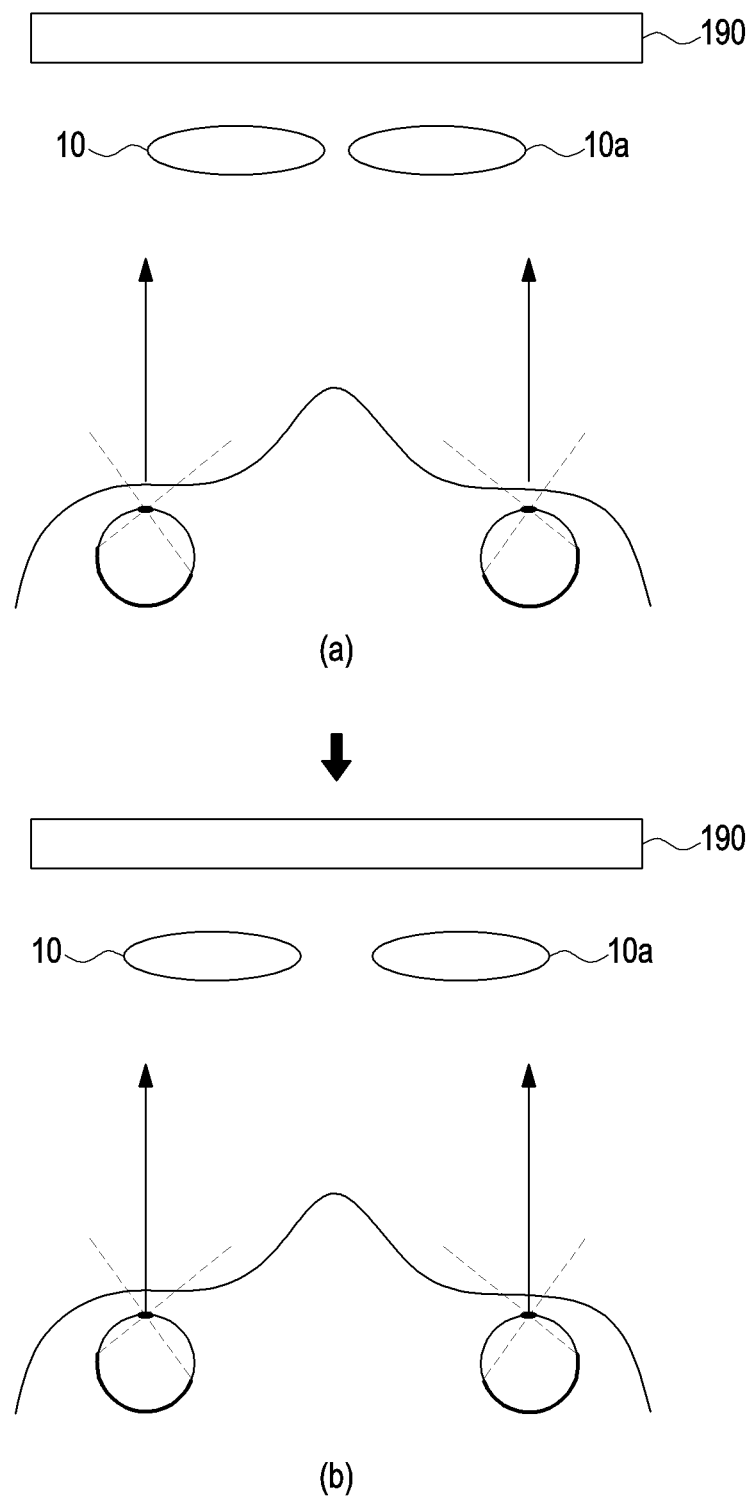
FIG. 6 is a view showing a method for adjusting a distance between optical lenses based on detected positions of both eyes and a detected gaze direction in a head mounted display apparatus according to an embodiment of the present disclosure.

FIG. 6 is a view showing a method for adjusting a distance between optical lenses based on detected positions of both eyes and a detected gaze direction in a head mounted display apparatus according to an embodiment of the present disclosure.

Referring to FIG. 6, the controller 110 according to an embodiment of the present disclosure may adjust a distance between the optical lenses 10 and 10*a* (or an inter ocular distance (IOD)) of the head mounted display apparatus 100, based on the IPD of the user determined from the image captured through the camera 310.

According to an embodiment shown in FIG. 6, the distance between the optical lenses 10 and 10*a* of the head mounted display apparatus 100 may be set based on a preset IPD reference value (e.g., 65 mm).

According to an embodiment, the controller 110 may compare the user's IPD determined based on the captured image with the preset IPD reference value (e.g., 65 mm) and determine that the determined IPD of the user is greater than the preset IPD reference value, thus adjusting to increase the distance between the optical lenses 10 and 10*a* from as in (a) set by default to as in (b).

According to an embodiment, the controller 110 may determine that the determined IPD of the user is less than the preset IPD reference value, thus adjusting to decrease the distance between the optical lenses 10 and 10*a* from as in (a) set by default.

The storage unit 175 of the head mounted display apparatus 100 according to an embodiment may store instructions for performing operations executed by the controller 110. The processor 111 may execute the instructions stored in the storage unit 175.

As such, in an embodiment, main components of a head mounted display apparatus have been described based on the head mounted display apparatus 100 of FIGS. 1A, 1B, 2, 3, 4A, and 4B. However, in various embodiments, all the components shown in FIGS. 1A, 1B, 2, 3, 4A, and 4B are not essential components, and the head mounted display apparatus 100 may be implemented with components more or less than the shown components. Positions of the main components of the head mounted display apparatus 100 described with reference to FIGS. 1A, 1B, 2, 3, 4A, and 4B may be changed according to various embodiments.

According to an embodiment, a head mounted display apparatus (e.g., the head mounted display apparatus 100 of FIGS. 1A, 1B, and 2) may include at least one display (e.g., the display unit 190 or 190*a* of FIGS. 1A, 1B, and 2), at least one camera (e.g., the camera 310 of FIG. 3) disposed behind a back surface of the at least one display, and a controller (e.g., the controller 110 of FIG. 2), in which the controller is configured to obtain an image regarding both eyes of a user through the at least one camera, detect the both eyes of the user from the obtained image, measure an inter-pupillary distance (IPD) of the user based on the detected both eyes of the user, convert a picture based on the measured IPD, and display the converted picture on the at least one display.

According to an embodiment, the controller may be configured to detect a gaze direction of the user from the obtained image and measure the IPD of the user based on the detected both eyes of the user and the detected gaze direction of the user.

According to an embodiment, the controller may be configured to measure the IPD of the user based on the detected both eyes of the user, the detected gaze direction of the user, and a position of the at least one camera.

According to an embodiment, the at least one camera may be disposed behind a back surface of the at least one display.

According to an embodiment, the at least one display may include a plurality of pixels and a micro lens provided on the plurality of pixels.

According to an embodiment, the head mounted display apparatus may further include two optical lenses located at a separation distance on a front surface or a back surface of the at least one display, in which the controller is configured to adjust a distance between the two optical lenses based on the measured IPD.

According to an embodiment, the head mounted display apparatus may further include two displays, in which the controller is configured to adjust a distance between the two displays based on the measured IPD.

According to an embodiment, the controller is configured to compare the measured IPD with a preset IPD reference value and convert the picture based on a result of comparison.

According to an embodiment, the controller is configured to compare the measured IPD with a preset IPD reference value and adjust the distance between the two optical lenses based on a result of comparison.

According to an embodiment, the controller is configured to adjust to increase the distance between the two optical lenses when the measured IPD is greater than the preset IPD reference value and adjust to decrease the distance between the two optical lenses when the measured IPD is less than the preset IPD reference value.

According to an embodiment, the controller is configured to compare the measured IPD with a preset IPD reference value and adjust the distance between the two displays based on a result of comparison.

Figure 7:
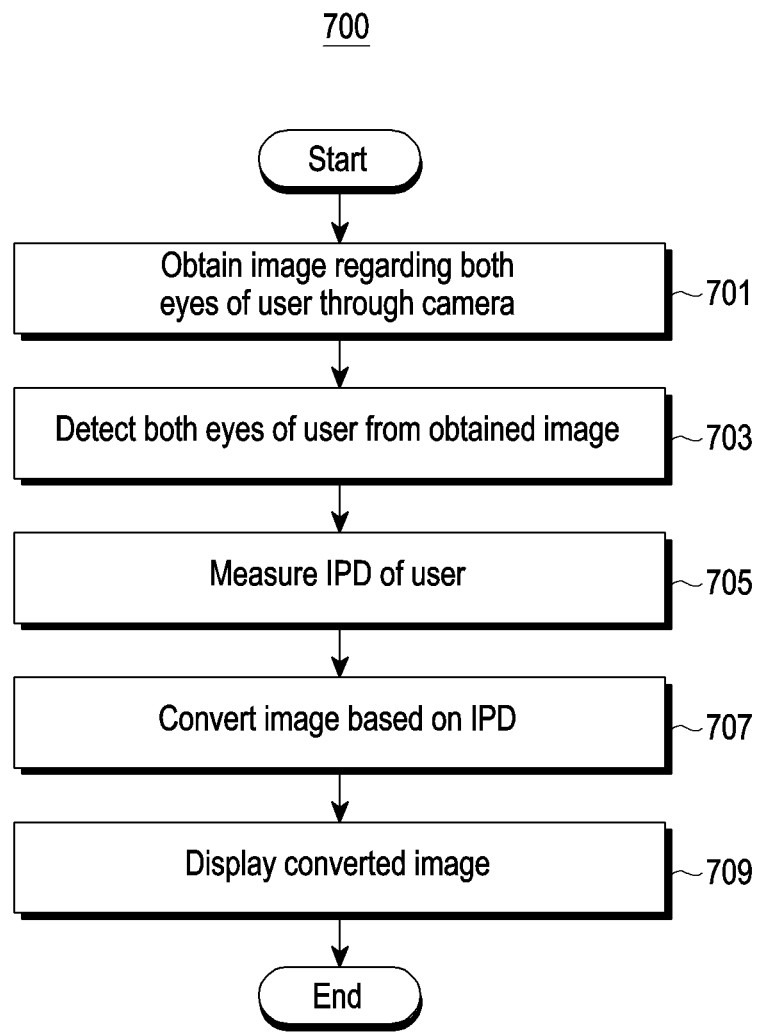
FIG. 7 is a flowchart showing an operating method of a head mounted display apparatus according to an embodiment of the present disclosure.

FIG. 7 is a flowchart 700 showing an operating method of a head mounted display apparatus according to an embodiment of the present disclosure.

According to various embodiments, operations shown in FIG. 7 may be performed in various orders without being limited to a shown order. According to various embodiments, operations that are more than those shown in FIG. 7 or at least one operation that is less than those shown in FIG. 7 may be performed.

Referring to FIG. 7, in operation 701, the head mounted display apparatus 100 may obtain at least one image regarding both eyes of the user through the at least one camera 310 included in the display unit 190 or 190*a*.

In operation 703, the head mounted display apparatus 100 may detect the both eyes of the user by processing the obtained image.

In operation 705, the head mounted display apparatus 100 may measure a IPD of the user based on the detected both eyes of the user.

In operation 707, the head mounted display apparatus 100 may correct or convert a picture to be displayed on the display 190 or 190*a* based on the measured IPD of the user.

In operation 709, the head mounted display apparatus 100 may display the converted picture, corrected or converted based on the measured IPD of the user, on the display unit 190 or 190*a*.

Figure 8:
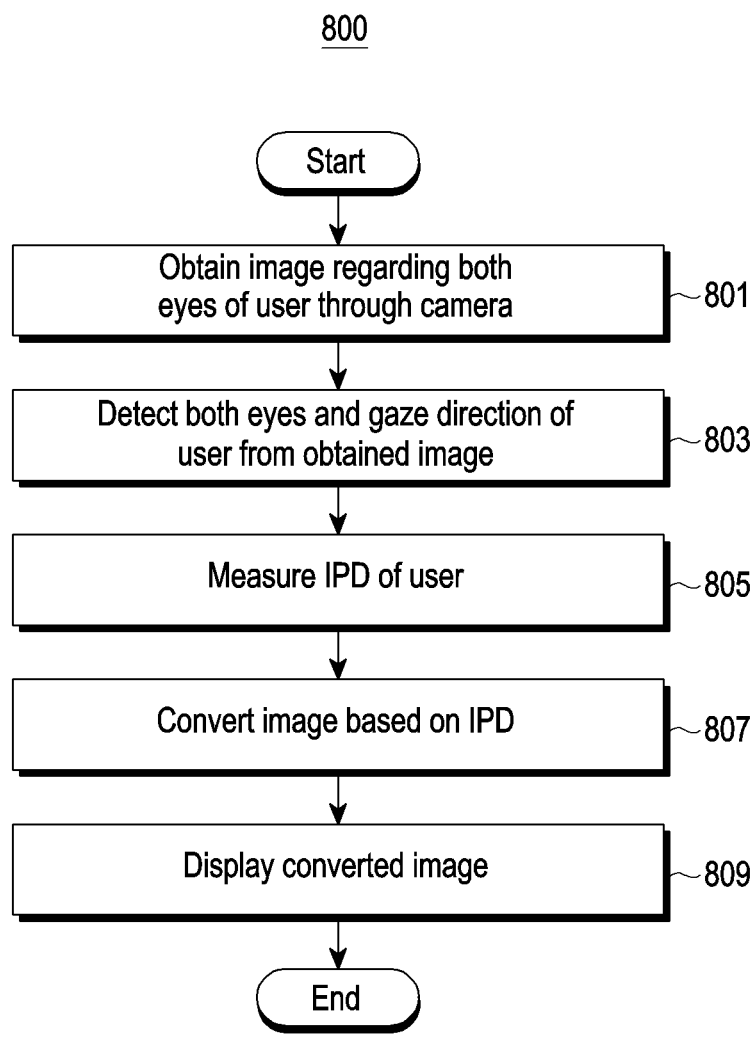
FIG. 8 is a flowchart showing an operating method of a head mounted display apparatus according to an embodiment of the present disclosure.

FIG. 8 is a flowchart 800 showing an operating method of a head mounted display apparatus according to an embodiment of the present disclosure.

According to various embodiments, operations shown in FIG. 8 may be performed in various orders without being limited to a shown order. According to various embodiments, operations that are more than those shown in FIG. 8 or at least one operation that is less than those shown in FIG. 7 may be performed.

Referring to FIG. 8, in operation 801, the head mounted display apparatus 100 may obtain at least one image regarding both eyes of the user through the at least one camera 310 included in the display unit 190 or 190*a*.

In operation 803, the head mounted display apparatus 100 may detect both eyes and a gaze direction of the user by processing the obtained image.

In operation 805, the head mounted display apparatus 100 may measure a IPD of the user based on the detected both eyes and gaze direction of the user. According to an embodiment, the head mounted display apparatus 100 may measure a IPD of the user based on the detected both eyes and gaze direction of the user and position information of the camera 310.

In operation 807, the head mounted display apparatus 100 may correct or convert a picture to be displayed on the display 190 or 190*a* based on the measured IPD of the user.

In operation 809, the head mounted display apparatus 100 may display the picture, corrected or converted based on the measured IPD of the user, on the display unit 190 or 190*a*.

Figure 9:
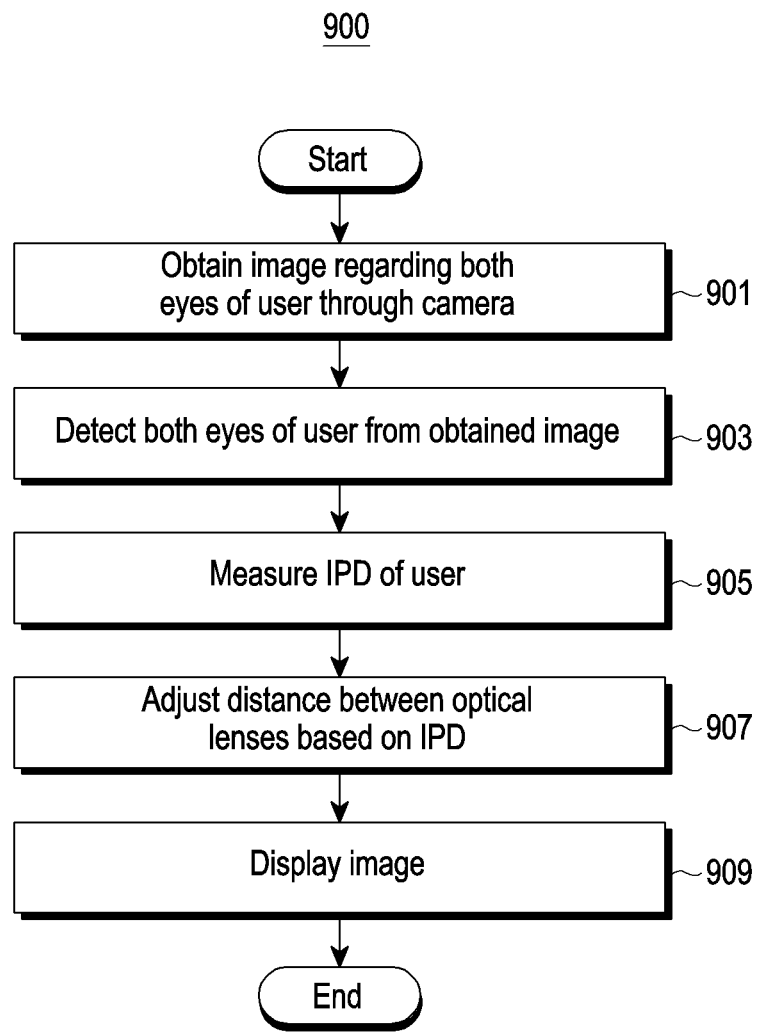
FIG. 9 is a flowchart showing an operating method of a head mounted display apparatus according to an embodiment of the present disclosure.

FIG. 9 is a flowchart 900 showing an operating method of a head mounted display apparatus according to an embodiment of the present disclosure.

According to various embodiments, operations shown in FIG. 9 may be performed in various orders without being limited to a shown order. According to various embodiments, operations that are more than those shown in FIG. 9 or at least one operation that is less than those shown in FIG. 7 may be performed.

Referring to FIG. 9, in operation 901, the head mounted display apparatus 100 may obtain at least one image regarding both eyes of the user through the at least one camera 310 included in the display unit 190 or 190*a*.

In operation 903, the head mounted display apparatus 100 may detect the both eyes of the user by processing the obtained image.

In operation 905, the head mounted display apparatus 100 may measure a IPD of the user based on the detected both eyes of the user. According to an embodiment, the head mounted display apparatus 100 may measure a IPD of the user based on the detected both eyes and gaze direction of the user and/or position information of the camera 310.

In operation 907, the head mounted display apparatus 100 may adjust a distance between the optical lenses 10 and 10*a* of FIG. 1A and the optical lenses 10 of FIG. 1B based on the measured IPD of the user.

According to an embodiment, the distance between the optical lenses 10 and 10*a* of the head mounted display apparatus 100 may be set based on a preset IPD reference value (e.g., 65 mm). According to an embodiment, the head mounted display apparatus 100 may compare the measured IPD of the user with the preset IPD reference value (e.g., 65 mm). When the measured IPD of the user is greater than the preset IPD reference value as a result of comparison, the head mounted display apparatus 100 may adjust to increase the distance between the optical lenses 10 and 10*a* from a default interval. When the measured IPD of the user is less than the preset IPD reference value as a result of comparison, the head mounted display apparatus 100 may adjust to decrease the distance between the optical lenses 10 and 10*a* from the default interval.

In operation 909, the head mounted display apparatus 100 may display a picture on the display unit 190 or 190*a* in a state where the distance between the optical lenses 10 and 10*a* of FIG. 1A and the optical lenses 10 of FIG. 1B is adjusted based on the measured IPD of the user.

While it is described with reference to FIG. 9 that the both eyes of the user are detected in operation 903 and the IPD is measured based on the both eyes of the user in operation 905, the both eyes and gaze direction of the user may be detected in operation 903 and the IPD may be measured based on the both eyes and gaze direction of the user in operation 905, according to another embodiment.

Figure 10:
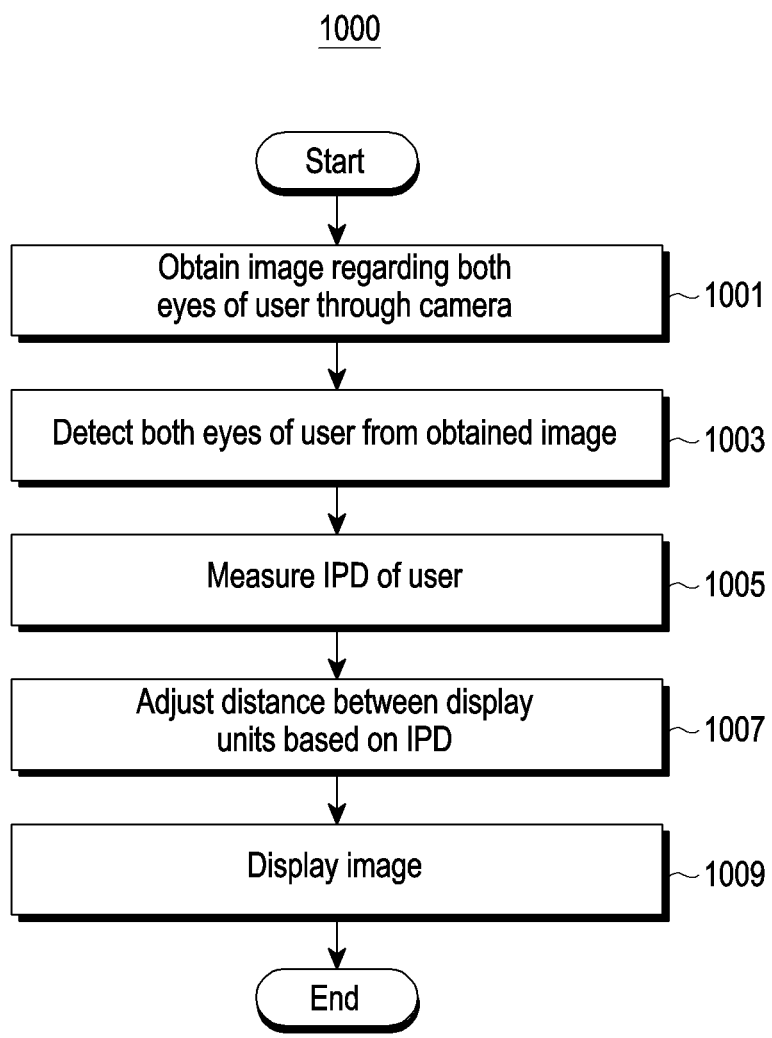
FIG. 10 is a flowchart showing an operating method of a head mounted display apparatus according to an embodiment of the present disclosure.

FIG. 10 is a flowchart 1000 showing an operating method of a head mounted display apparatus according to an embodiment of the present disclosure.

According to various embodiments, operations shown in FIG. 10 may be performed in various orders without being limited to a shown order. According to various embodiments, operations that are more than those shown in FIG. 10 or at least one operation that is less than those shown in FIG. 7 may be performed.

Referring to FIG. 10, in operation 1001, the head mounted display apparatus 100 may obtain at least one image regarding both eyes of the user through the at least one camera 310 included in the display unit 190 or 190*a*.

In operation 1003, the head mounted display apparatus 100 may detect the both eyes of the user from the obtained image.

In operation 1005, the head mounted display apparatus 100 may measure a IPD of the user based on the detected both eyes of the user. According to an embodiment, the head mounted display apparatus 100 may measure a IPD of the user based on the detected both eyes and gaze direction of the user and/or position information of the camera 310.

In operation 1007, the head mounted display apparatus 100 may adjust a distance between the display unit 190 and 190*a* based on the measured IPD of the user.

In operation 1009, the head mounted display apparatus 100 may display a picture on the display unit 190 or 190*a* in a state where the distance between the display units 190 and 190*a* is adjusted based on the measured IPD of the user.

While it is described with reference to FIG. 10 that the both eyes of the user are detected in operation 1003 and the IPD is measured based on positions of the both eyes of the user in operation 1005, the positions of the both eyes and gaze direction of the user may be detected in operation 1003 and the IPD may be measured based on the positions of the both eyes and gaze direction of the user in operation 1005, according to another embodiment.

According to an embodiment, a head mounted display apparatus comprises at least one display; at least one camera disposed behind a back surface of the at least one display; and a controller, a memory storing a plurality of instructions executable by the controller, wherein execution of the instructions cause the controller to performing a plurality of operations comprising: obtaining an image of both eyes of a user through the at least one camera; detecting the both eyes of the user from the obtained image; measuring an inter-pupillary distance (IPD) of the user based on the detected both eyes of the user in the image; converting a picture based on the measured IPD; and providing the converted picture to the at least one display, wherein the at least one display displays the converted picture.

According to certain embodiments, the plurality of operations further comprise: detecting a gaze direction of the user from the obtained image; and measuring the IPD of the user based on the detected both eyes of the user and the detected gaze direction of the user.

According to certain embodiments, the plurality of operations further comprise measuring the IPD of the user based on the detected both eyes of the user, the detected gaze direction of the user, and a position of the at least one camera.

According to certain embodiments, the at least one display comprises a plurality of pixels and a micro lens provided on the plurality of pixels.

According to certain embodiments, the head mounted display apparatus comprises two optical lenses located at a separation distance on a front surface or a back surface of the at least one display, and wherein the plurality of operations further comprise adjusting a distance between the two optical lenses based on the measured IPD.

According to certain embodiments, the head mounted display apparatus of comprises two displays, and wherein the plurality of operations further comprise adjusting a distance between the two displays based on the measured IPD.

According to certain embodiments, the plurality of operation further comprise comparing the measured IPD with a preset IPD reference value and converting the picture based on a result of comparison.

According to certain embodiments, the plurality of operations further comprise comparing the measured IPD with a preset IPD reference value and adjust the distance between the two optical lenses based on a result of comparison.

According to certain embodiments, the plurality of operations further comprise: adjusting to increase the distance between the two optical lenses when the measured IPD is greater than the preset IPD reference value; and adjusting to decrease the distance between the two optical lenses when the measured IPD is less than the preset IPD reference value.

According to certain embodiments, the plurality of operations further comprise comparing the measured IPD with a preset IPD reference value and adjusting the distance between the two displays based on a result of comparison.

According to certain embodiments, an operating method of a head mounted display apparatus comprises at least one display and at least one camera disposed behind a back surface of the at least one display. The operating method comprises: obtaining an image of both eyes of a user through the at least one camera; detecting the both eyes of the user from the obtained image; measuring an inter-pupillary distance (IPD) of the user based on the detected both eyes of the user in the image; converting a picture based on the measured IPD; and providing the converted picture to the at least one display, wherein the at least one display displays the converted picture.

According to certain embodiments, the operating method further comprises detecting a gaze direction of the user from the obtained image, wherein the measuring of the IPD of the user comprises measuring the IPD of the user based on the detected both eyes of the user and the detected gaze direction of the user.

According to certain embodiments, the measuring of the IPD of the user comprises measuring the IPD of the user based on the detected both eyes of the user, the detected gaze direction of the user, and a position of the at least one camera.

According to certain embodiments, the at least one display comprises a plurality of pixels and a micro lens provided on the plurality of pixels.

According to certain embodiments, a computer-readable recording medium has stored therein a program for executing operations by a controller in a head mounted display apparatus comprising at least one display and at least one camera disposed behind a back surface of the at least one display, the operations comprising: obtaining an image regarding both eyes of a user through the at least one camera; detecting the both eyes of the user from the obtained image; measuring an inter-pupillary distance (IPD) of the user based on the detected both eyes of the user in the obtained image; converting a picture based on the measured IPD; and displaying the converted picture on the at least one display.

The embodiments disclosed herein have been provided for description and understanding of disclosed technical matters, and are not intended to limit the scope of the present disclosure. Therefore, it should be construed that the scope of the present disclosure includes any change or other certain embodiments based on the technical spirit of the present disclosure.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. Such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in certain embodiments, the term "unit" may include a unit implemented in hardware, software, or firmware, and may interchangeably be used with other terms, for example, "logic," "logic block," "part," or "circuitry". A unit may be a single integral component, or a minimum unit or part thereof, adapted to perform one or more functions. For example, according to an embodiment, the unit may be implemented in a form of an application-specific integrated circuit (ASIC).

Certain embodiments as set forth herein may be implemented as software (e.g., a program) including one or more instructions that are stored in a storage medium (e.g., internal memory or external memory) that is readable by a machine (e.g., the head mounted display apparatus 100). For example, a controller (e.g., the controller 110) of the machine (e.g., the head mounted display apparatus 100) may invoke at least one of the one or more instructions stored in the storage medium, and execute the same. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least part of the computer program product may be temporarily generated or at least temporarily stored in the machine-readable storage medium, such as memory of the manufacturer's server, a server of the application store, or a relay server.

According to certain embodiments, each component (e.g., a unit or a program) of the above-described components may include a single entity or a plurality of entities, and some of the plurality of entities may be separately disposed on different components. According to certain embodiments, one or more of the above-described components may be omitted, or one or more other components may be added. Alternatively or additionally, a plurality of components (e.g., units or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the unit, the program, or another component may be carried out sequentially, in parallel, repeatedly, or heuristically, or one or more of the operations may be executed in a different order or omitted, or one or more other operations may be added.

The invention claimed is:

1. A head mounted display apparatus comprising:
   at least one display to display a picture;
   at least one camera under-display disposed behind the at least one display;
   a controller;
   a memory storing a plurality of instructions executable by the controller of the head mounted display apparatus, wherein execution of the instructions causes the head mounted display apparatus to performing a plurality of operations comprising:
   obtaining, while the at least one display is mounted on a head of a user, an image of both eyes of the user through the at least one camera under-display;
   identifying positions of the both eyes of the user from the obtained image;
   determining an inter-pupillary distance (IPD) of the user based on the identified positions of the both eyes of the user and a gaze direction of the user from the obtained image;
   converting the picture based on the determined IPD and the gaze direction to prevent VR motion sickness in the user; and
   controlling the at least one display to display the converted picture based on the determined IPD and the gaze direction.

2. The head mounted display apparatus of claim 1, wherein the plurality of operations further comprises:
   detecting a gaze direction of the user from the obtained image; and
   determining the IPD of the user based on the positions of each of the both eyes of the user in the obtained image and the detected gaze direction of the user in the obtained image.

3. The head mounted display apparatus of claim 2, wherein the plurality of operations further comprises measuring the IPD of the user based on the positions of each of the both eyes of the user in the obtained image, the detected gaze direction of the user, and a position of the at least one camera.

4. The head mounted display apparatus of claim 1, wherein the at least one display comprises a plurality of pixels and a plurality of micro lenses provided on a surface of the plurality of pixels facing the user.

5. The head mounted display apparatus of claim 1, further comprising two optical lenses located at a first distance in the first surface of the at least one display and facing the user, and wherein the plurality of operations further comprises adjusting a distance between the two optical lenses based on the determined IPD.

6. The head mounted display apparatus of claim 1, further comprising two displays, and wherein the plurality of operations further comprises adjusting a distance between the two displays based on the determined IPD.

7. The head mounted display apparatus of claim 1, wherein the plurality of operation further comprises comparing the determined IPD with a preset IPD reference value; and converting the picture based on the comparison.

8. The head mounted display apparatus of claim 5, wherein the plurality of operations further comprises comparing the measured IPD with a preset IPD reference value; and
   adjust the distance between the two optical lenses based on the comparison.

9. The head mounted display apparatus of claim 8, wherein the plurality of operations further comprises:
   increasing the distance between the two optical lenses when the measured IPD is greater than the preset IPD reference value; and
   decreasing the distance between the two optical lenses when the measured IPD is less than the preset IPD reference value.

10. The head mounted display apparatus of claim 6, wherein the plurality of operations further comprises
   comparing the measured IPD with a preset IPD reference value; and
   adjusting the distance between the two displays based on the comparison.

11. A method of operating a head mounted display apparatus comprising at least one display to display a picture and at least one under-display camera, the method comprising:
   obtaining, while the at least one display is mounted on a head of the user, an image of a left eye and a right eye of a user through the at least one under-display camera;
   identifying positions of the both eyes of the user from the obtained image;
   determining an inter-pupillary distance (IPD) of the user based on the identified positions of the both eyes of the user and a gaze direction of the user from the obtained image;
   converting the picture based on the determined IPD to prevent VR motion sickness in the user; and
   displaying the converted picture based on the determined IPD and the gaze direction on a first screen and a second screen of the at least one display.

12. The method of claim 11, further comprising; detecting a gaze direction of the user from the obtained image, wherein the IPD of the user is determined based on the positions of each of the left eye and the right eye of the user in the obtained image and the detected gaze direction of the user in the obtained image.

13. The method of claim 11, wherein the IPD of the user is measured based on the positions of each of the left eye and the right eye of the user in the obtained image, a detected gaze direction of the user, and a position of the at least one camera.

14. The method of claim 11, wherein the at least one display comprises a plurality of pixels and a plurality of micro lenses provided on a surface of the plurality of pixels facing the user.

15. A computer-readable recording medium having stored therein a program of instructions, which when executed by a processor performs a method of operating a head mounted display apparatus comprising at least one display to display a picture and at least one under-display camera disposed, the method comprising:
   obtaining, while the display is mounted on a head of a user, an image of both eyes of the user through the at least one under-display camera;
   identifying positions of the both eyes of the user from the obtained image;
   determining an inter-pupillary distance (IPD) of the user based on the identified positions of the both eyes of the user and a gaze direction of the user from the obtained image;
   converting the picture based on the determined IPD to prevent VR motion sickness in the user; and
   displaying the converted picture based on the determined IPD and the gaze direction.

* * * * *